Nov. 24, 1942.   J. H. NEHER   2,303,133
SUPERVISION OF ELECTRIC SYSTEMS
Filed July 5, 1941
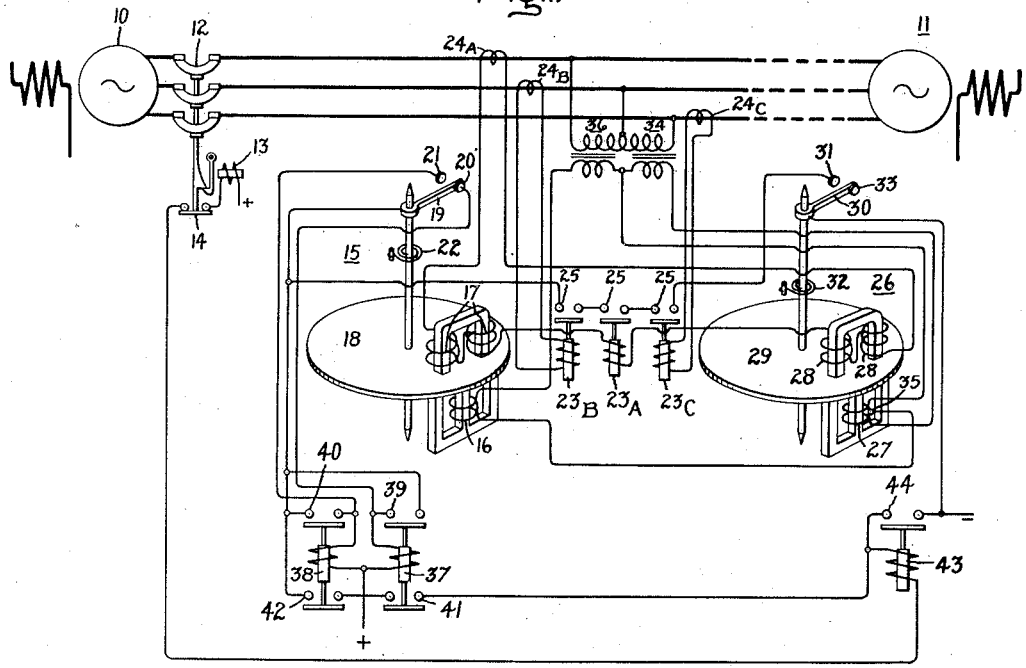
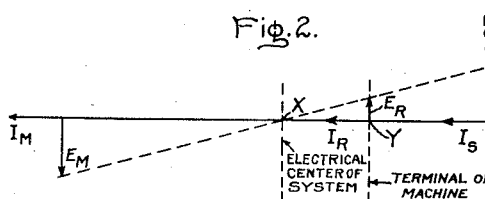
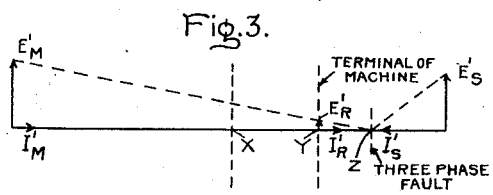
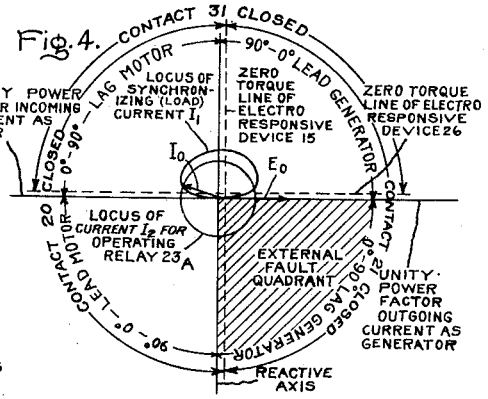
Inventor:
John H. Neher,
by Harry E. Dunham
His Attorney.

Patented Nov. 24, 1942

2,303,133

UNITED STATES PATENT OFFICE 2,303,133

SUPERVISION OF ELECTRIC SYSTEMS

John H. Neher, Merion, Pa., assignor to General Electric Company, a corporation of New York Application July 5, 1941, Serial No. 401,161

14 Claims. (Cl. 175—294)

My invention relates to improvements in the supervision of alternating-current electric systems and more particularly to an out-of-step protective system.

Faults on an alternating-current electric system have been known to cause synchronous machinery to fall out of step and thereby to produce such unstable voltage and current conditions in sound portions of the systems as to cause false operation of the fault-responsive protective relays and circuit breakers controlled thereby on the sound portions. Obviously, such false operation must be avoided because loads are likely to be left without any source of power. In United States Letters Patent 2,095,117, granted October 5, 1937, and assigned to the same assignee as the present application, there is disclosed and claimed a protective system which, on the occurrence of out-of-step conditions, subdivides the system in such a way as to eliminate the out-of-step condition while, at the same time, permitting an adequate source of power for every subdivision. The points of subdivision in the system are so chosen at which the normal exchange of power is small or such that the connected generating capacity in any subdivided part is sufficient to carry the load at that part. The arrangement disclosed and claimed in the above-mentioned patent, in order to distinguish between an asynchronous condition and a three-phase fault condition, requires three power reversals before tripping of out-of-step circuit breakers can occur.

In connection with the operation of alternating-current electric machinery, such, for example, as electric motors for driving frequency changer sets where the reactance of the electrical machine with respect to the system to which it is connected is large so that the impedance and reactance centers of the system including the machine fall within the electrical machine or normally on the machine side of the point at which the relaying quantities are obtained, I have discovered that it is unnecessary to wait for three power reversals to determine an out-of-step condition but operation of the protective apparatus may be obtained on the first pole slip.

Whenever an alternating-current synchronous machine pulls out of step, power reverses when the first pole is slipped and again when the machine passes the second pole, etc. Such power reversal may be detected by a power-directional relay connected at any point between the dynamoelectric machine and the system with which it is connected. However, the operation of this power-directional relay alone is not sufficient to indicate that the dynamoelectric machine has slipped a pole because there are three conditions under which the indication of the power flow can change. First, such a reversal of power occurs when the machine changes from motor to generator action while in step with the rest of the system which includes hunting and frame shifting. The reversal of real power of the system here occurs at low current. Secondly, with the dynamoelectric machine running as a motor, a fault occurring on the system will cause a change in the indication of the power-directional relay and when this fault is cleared an additional change will be indicated. Thirdly, an out-of-step condition will cause a reversal of the power-directional relay, these reversals being alternately at high currents and then at low currents or vice versa. It has been proposed to connect a fast-acting overcurrent electroresponsive device so that its contacts are in series with the power-directional relay. The setting of this overcurrent relay will be above the maximum reactive component of current carried by the system at that point and, by this arrangement, the protective scheme is able to distinguish between a swing condition, such as hunting of the machine, where reversal of power occurs at low current and an out-of-step condition where alternately the reversal of power occurs at high current. However, this arrangement does not distinguish between a three-phase fault occurring on the system and an out-of-step condition.

It is an object of my invention to provide a new and improved out-of-step protective scheme which operates the protective means earlier during the out-of-step condition than was heretofore possible.

It is another object of my invention to provide a new and improved protective system for quickly terminating an out-of-step condition in order to avoid the troubles associated with instability.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 illustrates diagrammatically an embodiment of my invention as applied to a polyphase alternating-current electric system, and Figs. 2, 3, and 4 are curve diagrams to aid in understanding the operation of the protective system illustrated in Fig. 1.

In Fig. 1, I have illustrated my invention as embodied in a polyphase alternating-current electric system comprising a dynamoelectric machine, such, for example, as a motor 10 connected to a system which may include a network, feeders, transformers, and other devices. In Fig. 1, these have been omitted for the sake of simplicity of illustration and have all been embodied schematically in a synchronous polyphase system generally indicated at 11 in the drawing. For disconnecting the dynamoelectric machine or motor 10 from the rest of the system under out-of-step conditions, a suitable circuit-interrupting means 12 is provided at the terminals of motor 10 which is illustrated as a latched closed circuit breaker having a trip coil 13 and an "a" switch 14 which is closed when the circuit breaker is closed and open when the circuit breaker is open. The reactance of dynamoelectric machine or motor 10 is such with respect to the alternating-current system that the electrical center of the system, which is the midpoint of the impedance or reactance between the two parts of the system, falls within the dynamoelectric machine 10 or on the machine side of the point at which the relaying quantities are obtained.

When a synchronous dynamoelectric machine pulls out of step, power reverses with each pole that is slipped and, accordingly, in order to detect such an out-of-step condition, I have provided an electroresponsive device generally indicated at 15 which is a power-directional relay connected so as to indicate reversal of the real power of the system. I have indicated electroresponsive device 15 as of the induction-disk type having a potential winding 16 and current windings 17. The induction disk 18 of electroresponsive device 15 is arranged to control a movable contact-controlling member 19 for engaging either contact 20 or 21 depending upon the direction of real power flow at the terminals of dynamoelectric machine 10. A suitable spring means 22 is provided to bias disk 18 in a clockwise direction.

An out-of-step condition is a balanced condition so that for all fault conditions occurring on a system except a three-phase fault, it is possible to distinguish readily between an asynchronous condition and an out-of-step condition by merely providing a plurality of overcurrent relays 23A, 23B, and 23C, which are energized from the secondary windings 24A, 24B, and 24C, respectively, associated with the respective phases of the polyphase line interconnecting the alternating-current system and dynamoelectric machine 10. Overcurrent relays 23A, 23B, and 23C are each arranged to control a set of contacts 25 which sets of contacts are connected in series with one another in a trip-conditioning circuit for electric circuit breaker 12. Under all fault conditions except three-phase faults, one or more of the relays 23A, 23B, or 23C will be dropped out so that tripping of circuit breaker 12 cannot occur.

In order to distinguish between an out-of-step condition and a three-phase fault occurring external to motor 10 on the alternating-current system 11, I provide, in addition to electroresponsive device 15 and overcurrent relays 23A, 23B, and 23C, an electroresponsive device, generally indicated at 26, which is a reactive power-directional relay indicating changes in direction of flow of reactive power between dynamoelectric machine 10 and the system 11. Electroresponsive device 26 is very similar to electroresponsive device 15 and, as shown, comprises a potential winding 27, current windings 28, an induction disk 29, and a contact-controlling member 30 for engaging contact 31 connected in the trip-conditioning circuit in series with the sets of contacts 25 and contacts 20 or 21 through member 19. A suitable spring means 32 is provided for electroresponsive device 26 to bias contact-controlling member 30 in a clockwise direction against a stop 33. Electroresponsive device 26, in order properly to measure the direction of reactive power flow, has its potential winding 27 and current windings 28 connected in quadrature as will be understood by those skilled in the art. This is accomplished by energizing current windings 28 from the secondary winding 24A of the current transformer associated with the polyphase alternating-current system while the potential winding 27 is energized from the potential transformer 34. With this arrangement, the current windings are energized with a current proportional to a current $I_A$ where $I_A$ is the current flowing in the phase conductor A of the system and the potential winding 27 is energized with the voltage $E_{BC}$ where $E_{BC}$ is the line-to-line voltage between phase conductors B and C of the system, thereby producing the ninety-degree phase relationship between the energizing current and the energizing voltage at unity power factor.

It will be understood by those skilled in the art that this quadrature relationship can be obtained in various manners if other than a three-phase system is involved. For example, in the case of a single-phase system, a series-parallel condenser-resistor combination may be provided for potential winding 27 to give the desired phase shift.

Electroresponsive device 15 is energized so as to indicate the direction of flow of real power of the system. Accordingly, current windings 17 are connected in series with the secondary winding 24A of the current transformer of the current winding so as to be energized with the current $I_A$. The potential winding 16 has one terminal thereof connected to a midtap 35 on potential winding 27 of electroresponsive device 26 while the other terminal thereof is connected to potential transformer 36 which is illustrated for the sake of simplicity as having a common primary and secondary terminal with potential transformer 34. In order to obtain a proper operation of electroresponsive devices 15 and 26 and overcurrent relays 23A, 23B, and 23C for controlling the tripping of circuit breaker 12, I have provided a pair of auxiliary relays 37 and 38 which have one terminal thereof connected to a source of potential while the other terminal thereof is connected to the other terminal of the source of potential through one of the contacts of electroresponsive device 15, the contacts 25 of overcurrent relays 23A, 23B, and 23C, and the contacts of the reactive power-directional relay 26. As illustrated, the auxiliary relay 37 is energized when the contact 20 of the electroresponsive device 15 is engaged by the contact-controlling member 19 while the relay 38 is energized when contact 21 is engaged by contact-controlling member 19, assuming in each case, of course, that all the contacts 25 of the overcurrent relays are closed and that contact member 30 engages contact 31. Relays 37 and 38 are each provided with means for controlling seal-in contacts 39 and 40, respectively, so as to remain energized even though a reversal of power indicated by electroresponsive device 15 occurs so long as the overcurrent relays and the reactive power-directional relays maintain their contacts in the closed position. Relays 37 and 38 also control contacts 41 and 42, respectively, connected in the trip circuit of circuit breaker 12. These contacts are connected in series with one another so that both relays 37 and 38 must be energized before tripping of circuit breaker 12 can occur.

In order to prevent damage to the contacts of electroresponsive device 26, overcurrent relays 23A, 23B, and 23C, and auxiliary relays 37 and 38, I have provided a seal-in relay 43 connected to be energized when the tripping of circuit breaker 12 is called for so as to bridge contacts 44 and by-pass all of the relay contacts mentioned above.

The operation of the protective system illustrated in Fig. 1 may best be understood by first referring to Figs. 2 and 3 which set forth the conditions existing at various points in the system under an out-of-step condition and under a three-phase fault condition. These figures are drawn on the assumption that the alternating-current system is a pure reactance system in order to simplify the analysis which follows hereafter. Actually, this is a fairly good assumption since normally such systems would have reactance equal to from eighty to ninety-five per cent of their impedance. Also Figs. 2 and 3 are drawn for a dynamoelectric machine connected to an alternating-current system in which the electrical center actually falls within the dynamoelectric machine. Referring now to Fig. 2, I have illustrated the vector relationship between the currents and potentials of the dynamoelectric machine or motor 10 and the corresponding quantities of the alternating-current system 11 as well as these quantities at the relaying point for the particular out-of-step condition when the corresponding voltages are one hundred and eighty degrees out of phase. The potential of the motor is represented as $E_M$. The motor current $I_M$ leads this potential $E_M$ by ninety electrical degrees. Similarly, the potential of the system is represented as $E_S$ and the system current $I_S$ lags the system voltage by ninety electrical degrees. The electrical center of the system is indicated at the point X while the terminals of the machine 10 are indicated by Y so that the electrical center of the system falls within the dynamoelectric machine 10. The relaying potential $E_R$ and relaying current $I_R$ being on the system side of the electrical center have the same phase relationship as the system electrical quantities. In Fig. 3, the same vector diagram is shown for a three-phase fault condition external to dynamoelectric machine 10 with the fault indicated at Z. The current and voltage vectors of Fig. 3 are designated in the same manner as those of Fig. 2 except marked with a prime. It will be observed that the potential $E_R'$ at the terminals of dynamoelectric machine 10 where the relaying potential is obtained is reversed with reference to the current $I_R'$ for the three-phase fault condition over that of the out-of-step condition illustrated in Fig. 2.

The actual operation of the protective system shown in Fig. 1 will be more easily understood if reference is made to the graphical representation of Fig. 4 in which $I_1$ represents the locus of the synchronizing current with reference to the neutral voltage $E_0$ at the terminals of the synchronous machine 10 for a pure reactance system when the machine 10 and the synchronous system 11 are operating out of synchronism; the curve $I_2$ represents the locus of the minimum current required to operate the overcurrent relays 23A, 23B, and 23C; the vertical dashed line represents the zero torque curve of the real power responsive relay 15; and the horizontal dashed line represents the zero torque curve of the reactive power responsive relay 26. The connections of the relay 26 are such that, when the current vector $I_0$ terminates above the horizontal dashed line, contact-controlling member 30 and contact 31 of the relay are in engagement as indicated in Fig. 4, whereas, when the current vector $I_0$ terminates below this line, the contact-controlling member 30 and contact 31 are out of engagement and the former is in engagement with the stop 33. The connections of the relay 15 are such that, when the current vector $I_0$ terminates to the left of the vertical dashed line, the contact-controlling member 19 and contact 20 of the relay 15 are in engagement as indicated in Fig. 4, whereas, when the current $I_0$ terminates to the right of this line, the contact-controlling member 19 and contact 21 are in engagement. Therefore, it will be observed that only when the current vector $I_0$ terminates in the upper right-hand quadrant formed by the vertical and horizontal dashed lines and outside the curve $I_2$ can a circuit be completed to energize the control relay 38 and only when the current vector terminates in the upper left-hand quadrant formed by the vertical and horizontal dashed lines and outside the curve $I_2$ can a circuit be completed to energize the control relay 37. Since both of the control relays 37 and 38 must be simultaneously energized in order to complete the energization of the trip circuit for circuit breaker 12, it is necessary, in order to effect the opening of this circuit breaker, that a reversal of real power occurs at the point where the relay 15 is connected while the flow of reactive power at the point where the relay 26 is connected is in a predetermined direction and also while the currents in all of the phases of the system are above predetermined values.

From curve $I_1$ of Fig. 4, it will also be seen that, during an out-of-step condition, the phase relation of the synchronizing current, which flows between the machine 10 and the synchronous system 11, varies with respect to the terminal line-to-neutral voltage $E_0$ of the machine 10 in such a manner that the real power flowing between the two machines reverses twice during each slip cycle, once at a high value of current which is above the current setting of the relays 23A, 23B, and 23C and once at a low value of current which is below the setting of the relays 23A, 23B, and 23C. The reversal of real power at high current occurs while the flow of reactive power is in a direction to cause electroresponsive device 26 to maintain its contact-controlling member 30 in engagement with contact 31. During the real power reversal at low current, the spring 32 keeps the contact-controlling member 30 against stop 33. Therefore, when an out-of-step condition occurs and it has progressed far enough so that the current vector $I_0$ terminates outside of the curve $I_2$ in the upper right-hand quadrant, a circuit is completed for auxiliary relay 38 since the contact-controlling member 30 and contact 31 of relay 26 are in engagement, the sets of contacts 25 for each of the respective overcurrent relays 23A, 23B, and 23C are closed, and the contact-controlling member 19 and contact 21 of relay 15 are in engagement. The closing of the contacts 40 of the auxiliary relay 38 completes a shunt circuit around the contact-controlling member 19 and contact 21 of the relay 15 so that the opening of these contacts, while the sets of contacts 25 remain closed and the contact-controlling member 30 and contact 31 remain in engagement, does not effect the deenergization of the auxiliary relay 38. When the out-of-step condition has progressed still further so that the current vector $I_0$ crosses the vertical dashed line representing the zero torque line of relay 15 and terminates outside of the curve $I_2$ in the upper left-hand quadrant, relay 15 operates to move its contact-controlling member 19 out of engagement with contact 21 and into engagement with contact 20 so that an energizing circuit is completed for the auxiliary relay 37 through the series connected contacts of the current relays 23A, 23B, and 23C and the contact-controlling member 30 and contact 31 of the relay 26. The closing of the contacts 41 of the relay 37 completes, through the contacts 42 of the energized auxiliary relay 38, an energizing circuit for the trip coil 13 of the circuit breaker 12 and the seal-in relay 43. The energization of the trip coil 13 effects the opening of the circuit breaker 12 so that the synchronous machine 10 is disconnected from the rest of the system represented at 11 whenever an out-of-step condition occurs.

Any fault which does not simultaneously produce in all of the phase conductors of the electric system currents sufficiently large to pick up all of the relays 23A, 23B, and 23C cannot effect the energization of the auxiliary relays 37 or 38. Hunting also does not affect the energization of the relays 37 or 38 because the power reversals then occur under low current conditions insufficiently high to cause the overcurrent relays 23A, 23B, and 23C to close their respective contacts.

Faults which simultaneously produce currents sufficiently large in all of the phase conductors of the electric system to pick up all of the overcurrent relays 23A, 23B, and 23C also do not affect the opening of the circuit breaker 12 because the overcurrents, which flow during such faults, are lagging currents and, therefore, the current vector $I_0$ terminates only in the shaded quadrant of Fig. 4 when the fault is outside of the machine 10 and only in the upper left-hand quadrant when the fault is inside of the machine 10. Since the contact-controlling member 30 and contact 31 of the relay 26 are out of engagement when the current vector $I_0$ terminates in the shaded external fault quadrant, neither of the auxiliary relays 37 and 38 is energized during a fault external to machine 10 involving all of the phase conductors. Since the current vector $I_0$ terminates outside of the curve $I_2$ in the upper left-hand quadrant when a fault involving all of the phase conductors occurs inside of the machine 10, an energizing circuit is completed for the control relay 37 through the contact-controlling member 30 and contact 31 of relay 26 and the sets of contacts 25 of the overcurrent relays 23A, 23B, and 23C, respectively and the contact-controlling member 19 and contact 20 of the relay 15. No energizing circuit, however, is completed for the control relay 38 while the fault current is flowing to an internal fault within machine 10 involving all of the phase conductors because the current vector $I_0$ does not terminate outside of the curve $I_2$ in the upper right-hand quadrant under such fault conditions.

From the above discussion, it will be observed that I have provided an out-of-step protective arrangement in which, as soon as dynamoelectric machine 10 slips the first pole during an out-of-step condition, tripping of circuit breaker 12 occurs and it is unnecessary to wait for a cumulative action means to operate as in the prior-art devices. It will be understood by those skilled in the art that a suitable counting chain or notching relay may be provided if desired so that tripping of circuit breaker 12 can be made to occur on any predetermined number of pole slips.

While I have shown and described a particular embodiment of my invention as applied to an electric protective system, it will be apparent to those skilled in the art that my invention is not limited to the particular embodiment shown but that changes and modifications may be made without departing from the spirit and scope of my invention and I aim in the appended claims to cover all such changes and modifications.

What I claim as new and desire to secure by Letters Patent of the United States is:

1. In combination with an alternating-current system, means responsive to an out-of-step condition of said system including power-directional means arranged for operation in dependence on the direction of flow of real power in said system, an overcurrent device and a second power-directional means responsive to the direction of flow of reactive power in said system, said power-directional means and over-current device being related in such a manner as to distinguish an out-of-step condition from other conditions which may exist on said system.

2. In combination with an alternating-current system, means responsive to an out-of-step condition of said system including a trip-conditioning circuit, a first power-directional means responsive to the direction of flow of reactive power in said system having contacts connected in said circuit, an overcurrent device responsive to the current flowing in said alternating-current system for controlling contacts connected in said circuit, and a second power-directional means including a plurality of contacts connected in said circuit arranged for operation in dependence on the direction of flow of real power in said system.

3. In combination with an alternating-current system, means responsive to an asynchronous condition of said system including a control circuit, a plurality of power-directional relays respectively responsive to the direction of flow of real and reactive powers in said system, and an overcurrent relay, said relays being energized from said system so as to cause energization of said control circuit upon the occurrence of predetermined electrical conditions on said system.

4. In combination with an alternating-current system including a dynamoelectric machine wherein the electrical center of the system is within the dynamoelectric machine, means for distinguishing between an asynchronous condition of the system and all fault conditions including a device to be operated, and means forming a part of said first-named means and connected to be energized from the system for effecting the operation of said device in dependence on the direction of flow of both real and reactive system power.

5. In combination with an alternating-current system including a dynamoelectric machine wherein the electrical center of the system is within the dynamoelectric machine, means for distinguishing between an asynchronous condition of the system and all fault conditions including a device to be operated, and means forming a part of said first-named means and connected to be energized from the system for effecting the operation of said device in dependence on the direction of flow of both real and reactive system power only when accompanied by abnormal current conditions in at least one of the phase conductors of said system.

6. In combination with an alternating-current system including a dynamoelectric machine wherein the electrical center of the system is within the dynamoelectric machine, means for distinguishing between an asynchronous condition of the system and all fault conditions including a device to be operated, and means forming a part of said first-named means and connected to be energized from the system for effecting the operation of said device in dependence on the direction of flow of both real and reactive system power only when accompanied by abnormal current conditions in all phase conductors of said system.

7. In combination with an alternating-current system including a dynamoelectric machine wherein the electrical center of the system falls within the dynamoelectric machine, means operative upon the first pole slip of said dynamoelectric machine for distinguishing between an asynchronous condition of the system and all fault conditions including a device to be operated, and a plurality of relays energized from said system for effecting the operation of said device.

8. In combination with an alternating-current system including a dynamoelectric machine wherein the electrical center of the system falls within the dynamoelectric machine, means operative upon the first pole slip of said dynamoelectric machine for distinguishing between an asynchronous condition of the system and all fault conditions including a control circuit, and means for energizing said control circuit only upon the occurrence of an asynchronous condition of the system comprising power-directional and overcurrent electroresponsive devices.

9. In combination with an alternating-current system including a dynamoelectric machine, a circuit-interrupting means interconnecting said dynamoelectric machine with the rest of said alternating-current system, the reactance of said dynamoelectric machine with respect to the system reactance being such that the electrical center of said system falls within said dynamoelectric machine, and means operative upon the first pole slip of said dynamoelectric machine and responsive only on out-of-step conditions of said system for causing opening of said circuit-interrupting means.

10. In combination with an alternating-current system including a dynamoelectric machine, a circuit-interrupting means interconnecting said dynamoelectric machine with the rest of said alternating-current system, the reactance of said dynamoelectric machine with respect to the system reactance being such that the electrical center of said system falls within said dynamoelectric machine, and means operable on the first pole slip of said dynamoelectric machine capable of distinguishing between out-of-step conditions and all fault conditions or swings within the stability limit of said dynamoelectric machine for causing opening of said circuit-interrupting means.

11. In combination with an alternating-current system including a dynamoelectric machine, a circuit-interrupting means interconnecting said dynamoelectric machine with the rest of said alternating-current system, the reactance of said dynamoelectric machine with respect to the system reactance being such that the electrical center of said system falls within said dynamoelectric machine, and means operative only on out-of-step conditions of said system for causing opening of said circuit-interrupting means upon the first pole slip of said dynamoelectric machine comprising a pair of power-directional relays connected to said circuit so as to be responsive to real and reactive power respectively and an overcurrent relay.

12. An arrangement for distinguishing between an out-of-step condition in an alternating-current system and a fault involving all of the phase conductors of said system comprising means responsive to a reversal of the real power in said system at a point on one side of the electrical center of said system only while the flow of reactive power at a point on the same side of the electrical center is in a predetermined direction.

13. An arrangement for distinguishing between an out-of-step condition in an alternating-current system and any fault condition comprising means responsive to a reversal of real power in said system at a point on one side of the electrical center of said system only while the flow of reactive power at a point on the same side of the electrical center is in a predetermined direction and the current in each phase conductor of said system is above a predetermined value.

14. An arrangement for distinguishing betwen an out-of-step condition in an alternating-current system and a fault involving all of the phase conductors of said system comprising means responsive to a reversal of the real power in said system at a point on one side of the electrical center of said system only while the flow of reactive power at a point on the same side of the electrical center is in a predetermined direction and the current in said system is above a predetermined value.

JOHN H. NEHER.